(12) United States Patent
Higaki et al.

(10) Patent No.: US 6,804,396 B2
(45) Date of Patent: Oct. 12, 2004

(54) GESTURE RECOGNITION SYSTEM

(75) Inventors: Nobuo Higaki, Saitama (JP); Yuichi Yoshida, Saitama (JP); Kikuo Fujimura, Menlo Park, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 731 days.

(21) Appl. No.: 09/820,130

(22) Filed: Mar. 28, 2001

(65) Prior Publication Data

US 2002/0181773 A1 Dec. 5, 2002

(51) Int. Cl.⁷ .................................................. G06K 9/00
(52) U.S. Cl. ...................................................... 382/181
(58) Field of Search ................................. 382/165, 170, 382/181, 218; 704/231, 233, 235, 236, 246, 251; 725/19; 345/863, 728; 348/14.01, 14.1; 367/198; 340/5.21, 5.24

(56) References Cited

U.S. PATENT DOCUMENTS

| | | | |
|---|---|---|---|
| 5,432,417 A | | 7/1995 | Takenaka et al. ...... 318/568.12 |
| 5,594,810 A | | 1/1997 | Gourdol ..................... 382/187 |
| 6,072,494 A | | 6/2000 | Nguyen ...................... 345/863 |
| 6,111,580 A | * | 8/2000 | Kazama et al. ............. 345/863 |
| 6,154,723 A | * | 11/2000 | Cox et al. ................... 704/270 |
| 6,219,639 B1 | * | 4/2001 | Bakis et al. ................. 704/246 |
| 6,243,683 B1 | * | 6/2001 | Peters ......................... 704/273 |
| 6,256,400 B1 | * | 7/2001 | Takata et al. ............... 382/103 |
| 6,393,136 B1 | * | 5/2002 | Amir et al. .................. 382/103 |
| 6,421,453 B1 | * | 7/2002 | Kanevsky et al. .......... 382/115 |
| 6,509,707 B2 | * | 1/2003 | Yamashita et al. ......... 318/567 |
| 6,526,395 B1 | * | 2/2003 | Morris ......................... 706/20 |
| 6,570,588 B1 | * | 5/2003 | Ando et al. ................. 345/728 |
| 6,720,949 B1 | * | 4/2004 | Pryor et al. ................. 345/158 |

FOREIGN PATENT DOCUMENTS

| | | | |
|---|---|---|---|
| JP | 8-184951 | 7/1996 | ........... G06F/3/033 |
| JP | 10-031561 A | 2/1998 | ............. G06F/3/06 |
| JP | 2000-113164 | 9/1998 | ............. G06T/1/00 |
| JP | 10-278346 A | 10/1998 | .............. B41J/2/51 |

OTHER PUBLICATIONS

S. Araki et al, Splitting Active Contour Models Based on Crossing Detection and its Applications, Technical paper of IEICE No. PRU95–21, May. 1995, pp 1–9.

* cited by examiner

*Primary Examiner*—Andrew W. Johns
*Assistant Examiner*—Shervin Nakhjavan
(74) *Attorney, Agent, or Firm*—Fenwick & West LLP (57) ABSTRACT

The present invention provides a system for recognizing gestures made by a moving subject. The system comprises a sound detector for detecting sound, one or more image sensors for capturing an image of the moving subject, a human recognizer for recognizing a human being from the image captured by said one or more image sensors, and a gesture recognizer, activated when human voice is identified by said sound detector, for recognizing a gesture of the human being.

In a preferred embodiment, the system includes a hand recognizer for recognizing a hand of the human being. The gesture recognizer recognizes a gesture of the human being based on movement of the hand identified by the hand recognizer. The system may further include a voice recognizer that recognizes human voice and determines words from human voice input to the sound detector. The gesture recognizer is activated when the voice recognizer recognizes one of a plurality of predetermined keywords such as "hello!", "bye", and "move".

11 Claims, 11 Drawing Sheets

GESTURE RECOGNITION SYSTEM

BACKGROUND OF THE INVENTION

The present invention relates to a computer system for recognizing human gestures, more specifically to a gesture recognition system that is adapted for incorporation into a bipedal robot.

U.S. Pat. No. 5,432,417 entitled "Locomotion Control System for Legged Mobile Robot", assigned to the same assignee of the present invention discloses a bipedal walking robot. A computer provided on the back of the robot controls the movement of the legs, thighs, and the trunk of the robot such that it follows target ZMP (Zero Moment Point) at which point a horizontal moment that is generated by the ground reaction force is zero. It is desired that the robot understands gestures of a human being so that a person can give instructions to the robot by gesture. More generally, it is desired that human gestures be recognized by a computer system as an input to the computer system without significantly increasing the workload of the computer system.

Japanese laid open patent application (Kokai) No. 10-31561 (application No. 8-184951) discloses a human interface system wherein hand gesture or body action is recognized and used as an input to a computer. Images of a hand and a body are captured with an image sensor which can be a CCD or an artificial retina chip. In a specific embodiment, edges of an input image are produced with the use of a random access scanner in combination with a pixel core circuit so as to recognize movement of a hand or a body.

U.S. Pat. No. 6,072,494 describes a gesture recognition system. A human gesture is examined one image frame at a time. Positional data is derived and compared to data representing gestures already known to the system. A frame of the input image containing the human being is obtained after a background image model has been created.

U.S. Pat. No. 5,594,810 describes a computer system for recognizing a gesture. A stroke is input on a screen by a user, and is smoothed by reducing the number of points that define the stroke. Normalized stroke is matched to one or more of gesture prototypes by utilizing a correlation score that is calculated for each prototype.

Technical Paper of the Institute of Electronics, Information and Communication Engineers (IEICE), No. PRU95-21 (May 1995) by S. Araki et. al, entitled "Splitting Active Contour Models Based on Crossing Detection and Its Applications" discussed about active contour models (SNAKES). It splits a contour model into plural contours by detecting self-crossing of the contour model. An initial single contour, for which an image frame can be selected, is iteratively split into multiple contours at the crossing parts, thus extracting plural subjects from the initial single contour. A contour of moving subjects can be produced utilizing the optical flow scheme, which itself is well known in the art. For example, it was discussed by Horn, B. K. P. and Schunck, B., "Determining optical flow", Artificial Intelligence, Vol. 17, pp 185-203, 1981.

Japanese laid open patent application (Kokai) No. 2000-113164(application No. 10-278346) assigned to the same assignee of the present invention discloses a scheme of recognizing a moving subject in a car by viewing an area of a seat with a CCD camera where a person may be seated. With the use of Sobel filter, an edge picture of objects in an image frame is produced. The edge picture includes edges of an upper portion of the person seated, a part of the seat that is not covered by the person, and a background view. By taking difference of two edge pictures produced from two consecutive image frames, a contour or edge of a moving subject, that is a human being, is extracted because edges of static objects disappear in the difference of the two edge pictures. The scheme is used to identify the position of the head of the person seated in a seat.

The gesture recognition system of the above-identified Kokai No. 10-31561 includes a voice input device comprising a microphone whereby a voice input is analyzed and recognized. The results of hand gesture and body action recognition and voice recognition are combined to control such apparatus as a personal computer, home electric appliances (a television, an air conditioner, and an audio system), game machine and a care machine.

In cases where a computer system executes a number of different jobs, consideration needs to be paid such that the CPU of the computer system does not become overly loaded with jobs. In the case of an on-board computer system for controlling a robot, for example, it is busy controlling the posture and movement of the robot, which includes collecting various data from many parts of the robot and computing adequate force to be applied to various actuators located at a number of joint portions. There thus is a need for a computer system that activates the gesture recognition function only when it is needed.

SUMMARY OF THE INVENTION

The present invention provides a system for recognizing gestures made by a moving subject. In accordance with one aspect of the invention, the system comprises a sound detector for detecting sound, one or more image sensors for capturing an image of the moving subject, a human recognizer for recognizing a human being from the image captured by said one or more image sensors, and a gesture recognizer, activated when human voice is identified by said sound detector, for recognizing a gesture of the human being.

In a preferred embodiment, the system includes a hand recognizer for recognizing a hand of the human being. The gesture recognizer recognizes a gesture of the human being based on movement of the hand identified by the hand recognizer. The system may further include a voice recognizer that recognizes human voice and determines words from human voice input to the sound detector. The gesture recognizer is activated when the voice recognizer recognizes one of a plurality of predetermined keywords such as "hello!", "bye", and "move".

The system may further include a head recognizer that recognizes the position of the head of the human being. The hand recognizer determines the position of the hand relative to the position of the head determined by the head recognizer. The system may include a storage for storing statistical features of one or more gestures that relate to positions of the hand relative to the position of the head, an extractor for extracting features of the movement of the hand as recognized by said hand recognizer, and a comparator for comparing the extracted features with the stored features to determine a matching gesture. The statistical features may preferably be stored in the form of normal distribution, a specific type of probability distribution.

In a preferred embodiment, the hand recognizer recognizes a hand by determining the portion that shows large difference of positions in a series of images captured by the image sensors.

In another embodiment, the sound detector includes at least two microphones placed at a predetermined distance for determining the direction of the human voice. The human recognizer identifies as a human being a moving subject located in the detected direction of the human voice.

In accordance with another aspect of the invention, a robot is provided that incorporates the system discussed above. The robot is preferably a bipedal walking robot such as discussed in the above-mentioned U.S. Pat. No. 5,432,417, which is incorporated herein by reference.

DETAILED DESCRIPTION OF THE PREFERRED EMBODIMENTS

Figure 1:
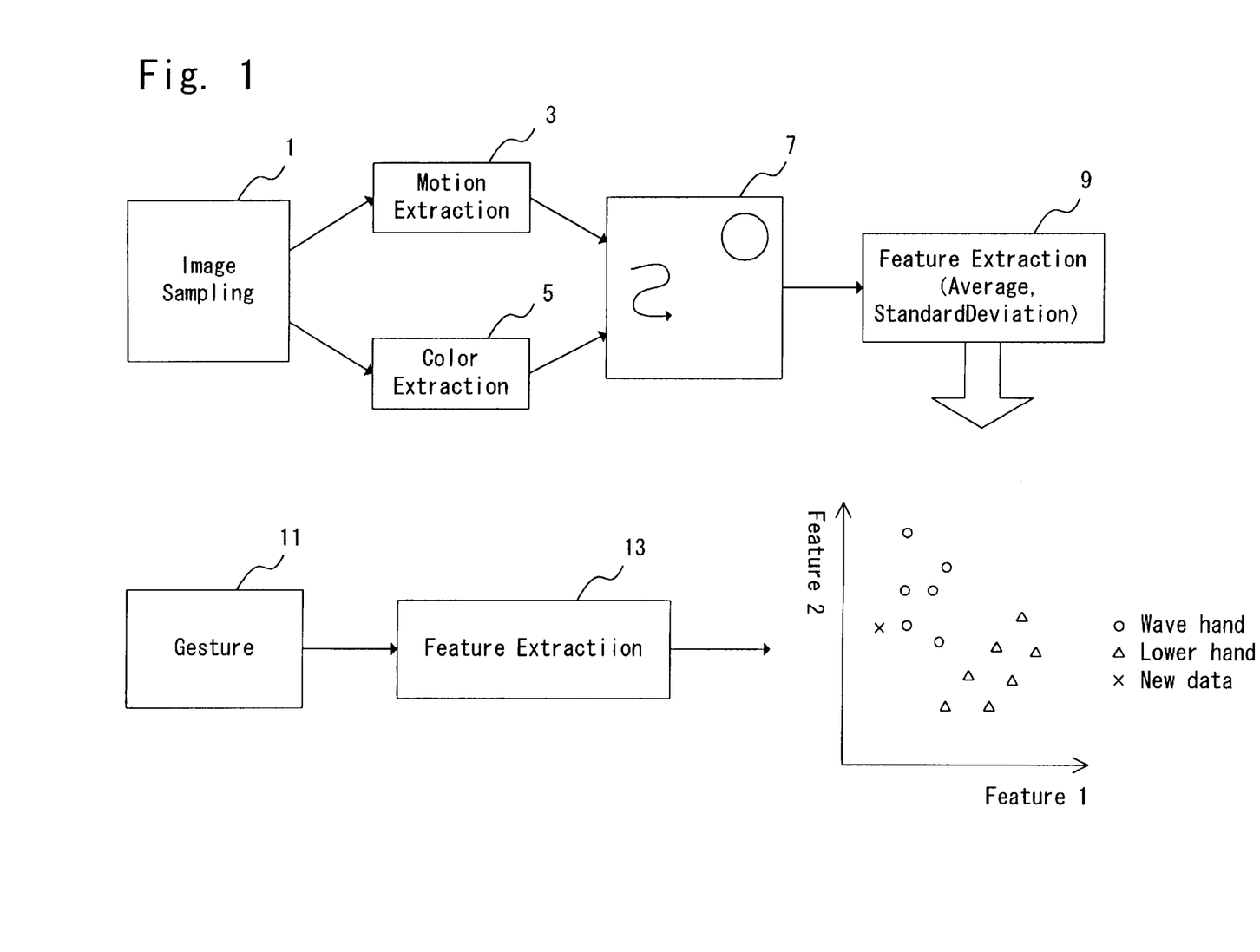
FIG. 1 is a block diagram illustrating a general structure of a system in accordance with one embodiment of the present invention.

Referring now to FIG. 1, a general scheme of gesture recognition will be described. A moving image sampling unit 1 captures moving images of a person performing a gesture such as a gesture of waving a hand. In one embodiment, the sampling unit 1 captures ten frames of sequential scenes of a gesture. The unit 1 captures similar images of different persons performing the same gesture. It also captures moving images of persons performing another gesture. Thus, moving image samples are produced of a plurality of persons performing predetermined gestures. For example, twenty moving image samples are produced relative to a gesture of waving hand, a gesture of shaking hands, and a gesture of pointing respectively. Each moving image sample comprises a plurality of sequential image frames produced by an image sensor such as a CCD camera when a person performs a gesture in front of the image sensor.

A motion extraction part 3 extracts motion from each moving sample. One typical method for extracting contours or edges of moving subjects from a moving image sample is the scheme called SNAKES and discussed by Araki et. al in the above cited paper "Splitting Active Contour Models Based on Crossing Detection and Its Applications". According to this method, optical flow is calculated from two frames of image captured sequentially. The optical flow is a vector representation of flow (movement) of a pixel between two frames of image. The method is described in the above-cited reference of Horn, B. K. P. and Schunck, B., "Determining optical flow". By sparkling only those pixels whose optical flows are larger than a threshold value, a frame of image is obtained where a moving subject can be seen as a bright block. The contour (edge) of the moving subject is extracted from this frame of image.

In another embodiment, a contour of the moving subject may be extracted by producing at least two edge pictures from at least two image frames with the use of Sobel filter and by taking difference of at least two edge pictures in accordance with the scheme as discussed in the above mentioned Kokai No. 2000-113164.

The position of the face is determined from its shape. For this purpose, color information on human being may be used. A color detection unit 5 detects the color of the image at its possible face position. Then, a hand trajectory unit 7 extracts a trajectory of a hand or arm of the human being from a series of contour frames of the sample person in terms of relative position with respect to the face. The same process is carried our for plural sample persons relative to each gesture.

A feature extraction unit 9 extracts features of each gesture performed by each sample person in terms of an average position (x, y) of the hand relative to the face, and variance (z, w) of the position values of the hand for each sample person. Thus, a feature $r_i$ of a gesture of a given sample person is expressed by parameters $x_i$, $y_i$, $z_i$, and $w_i$. The features of the same gesture performed by a number of persons produce a cluster of the features r in a four dimensional space. For simplicity, the coordinate chart in FIG. 1 shows the plots of such features in two-dimensional space. Each circular dot represents features of the gesture of waving a hand performed by each sample person. Each triangular dot represents a feature of a gesture of moving a hand at lower position performed by each sample person.

The cluster can be expressed by a distribution function, typically a normal distribution function, which is a function of the average value of the position of the hand for all samples and the standard deviation or variance of the samples (the standard deviation is a square root of the variance). This distribution function corresponds to pre-probability $P(\omega_i)$ of the gesture $\omega_i$.

In accordance with Bayes method, the probability $P(\omega_i|r)$ that a given feature r represents the gesture $\omega_i$ is determined by the following equation.

$$P(\omega_i|r) = \frac{P(r|\omega_i)P(\omega_i)}{P(r)} \quad (1)$$

$P(r|\omega_i)$ is the probability that an image has feature r when a gesture $\omega_i$ is given. $P(r)$ is the probability of feature r. $P(r|\omega_i)$ can be expressed by the following equation:

$$P(r|\omega_i) = \frac{1}{2\pi\sqrt{|\Sigma|}} e^{-(\omega_i - \varpi_i, \Sigma^{-1}(\omega_i - \varpi_i))/2} \quad (2)$$

where $\Sigma$ is a covariance matrix expressed by the following equation:

$$\sum_{i} = \begin{pmatrix} E[(x-E[x])^2] & E[(x-E[x])(y-E[y])] \\ E[(y-E[y])(x-E[x])] & E[(y-E[y])^2] \end{pmatrix} \quad (3)$$

where E[ ] denote an expectancy value.

Thus, once $P(\omega_i)$, $P(r|\omega_i)$ and $P(r)$ are determined, the probability that a given feature r represents gesture $\omega_i$ can be determined by the equation (1). Referring to FIG. 1, when a gesture is captured (11) and feature r is extracted (13), the gesture $\omega_i$ that has a largest value according to equation (1) is determined to be the gesture that the feature r represents.

Figure 2:
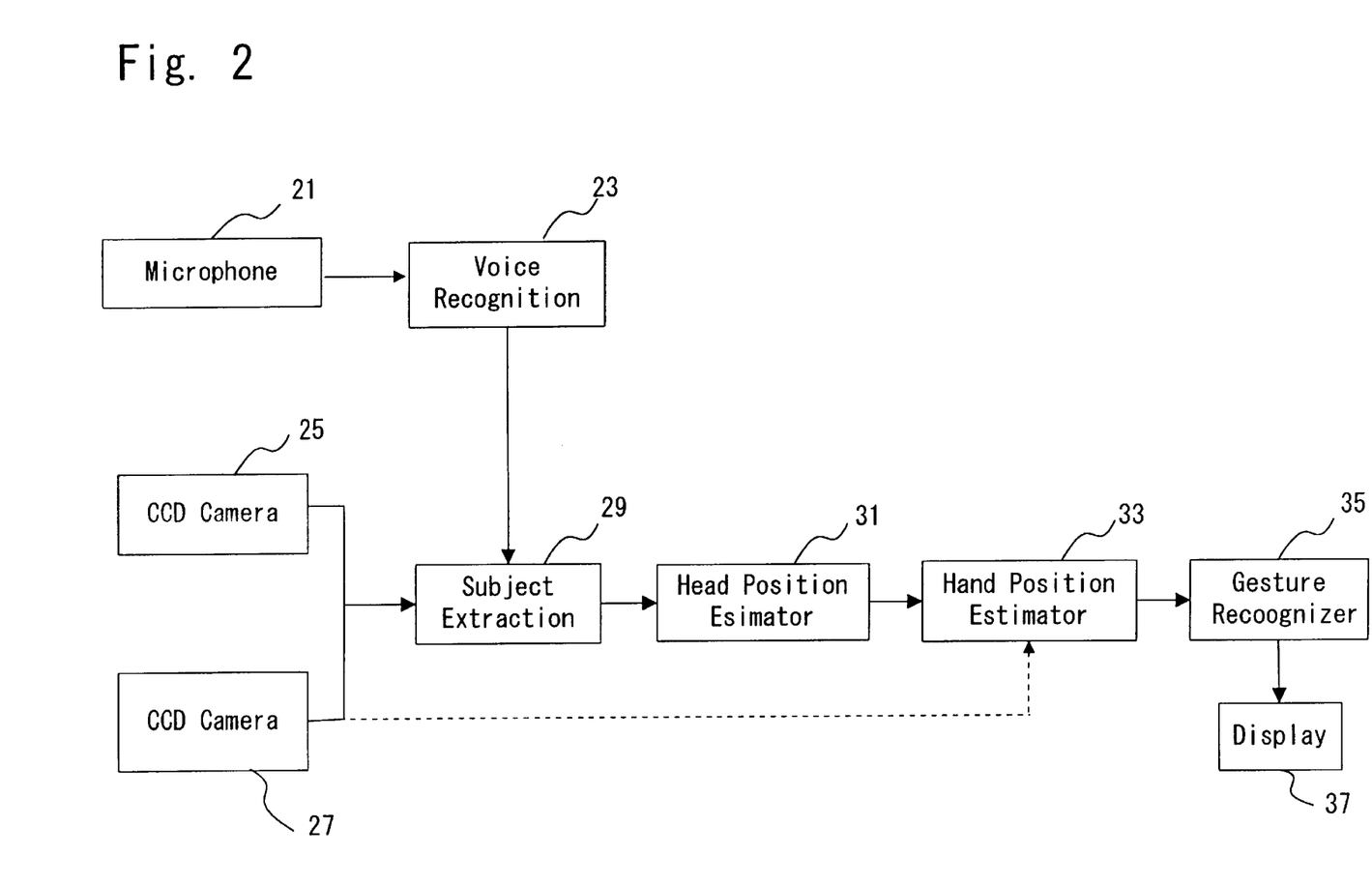
FIG. 2 is a block diagram of a system of one embodiment of the present invention.

Referring now to FIG. 2, one embodiment of the present invention is described in more details. A bipedal robot such as the one discussed in the above mentioned U.S. Pat. No. 5,432,417 is provided with at least one microphone 21, and one or two CCD cameras 25, 27. A voice recognition unit 23 receives sound input from the microphone 21, recognizes human voice and determines if it includes one of predetermined keywords that are programmed to activate the gesture recognition system. When one of such keywords is recognized, it passes a signal to a subject extractor 29 indicating that human voice is identified. The voice recognition unit 23 may be implemented by one of the voice recognition programs that are available in the market. A number of computer manufacturers and/or software houses have been marketing voice recognition programs that enable users to enter commands to a personal computer by voice.

The subject extractor 29 and subsequent process units that are in essence implemented by computer programs are activated responsive to the signal passed by the voice recognition unit 23. The subject extractor extracts the contour or edge of a moving subject in a manner discussed heretofore. That is, the moving subject may be determined by the SNAKES scheme or by the use of Sobel filters.

A face position estimator 31 determines the position of the face of the moving subject by its position in the contour and its shape. A generally round part at the top of the contour is determined to be the face or head of a human being.

A hand position estimator 33 determines the relative position (x, y) of a hand to the head. The position of a hand is judged by determining the part of the contour of the subject that has largest movement in a series of image frames captured by the CCD camera. The image frames can be those processed by the subject extractor 29 and the head position estimator, or can be the image frames captured by CCD camera 27 and provided directly to the hand position estimator 33.

The moving part can be determined by the use of the scheme discussed in the above-mentioned Japanese laid open patent application (Kokai) No. 2000-113164. Briefly, an edge picture of the subject in an image frame is extracted by the use of Sobel filter. By taking difference of two edge pictures produced from two consecutive image frames, a contour or edge of a moving subject is extracted. Static objects disappear in the difference of the two edge pictures because the difference is zero.

In one embodiment, nine contour pictures are produced from ten consecutive image frames, each contour picture being produced from two consecutive image frames. Sampling points in each contour picture is expressed by (x, y) coordinates, which are converted into a relative coordinates with the center of the head $(x_0, y_0)$ defined as the reference point. Thus, the relative coordinate for a position (x, y) is $(x_0-x, y_0-y)$. The relative coordinates of corresponding sampling points in the nine contour pictures are compared to determine the sampling point that has the largest difference.

The sampling point thus determined is judged to represent the position of a hand in terms of relative position to the head. The average of the sampling points thus determined is calculated for the nine contour pictures. Covariance of the sampling points representing the hand is calculated by the above-referenced equation (3) for calculating a covariance. The average and the covariance thus computed represent the feature "r" of a gesture performed by the present moving subject.

A gesture recognizer 35 determines a gesture $\omega_i$ that has a largest value in the above mentioned Bayse equation (1). The gesture thus recognized is communicated to a controller of the robot that reacts to the gesture in a manner as programmed. If the gesture is determined to be "bye-bye", the controller, if so programmed, will send commands to actuators that move the robot arm and hand in a manner to perform "bye-bye". The gesture determined by the recognizer 35 may also be displayed in a monitor screen 37 such as a CRT display or a LCD display.

Figure 5:
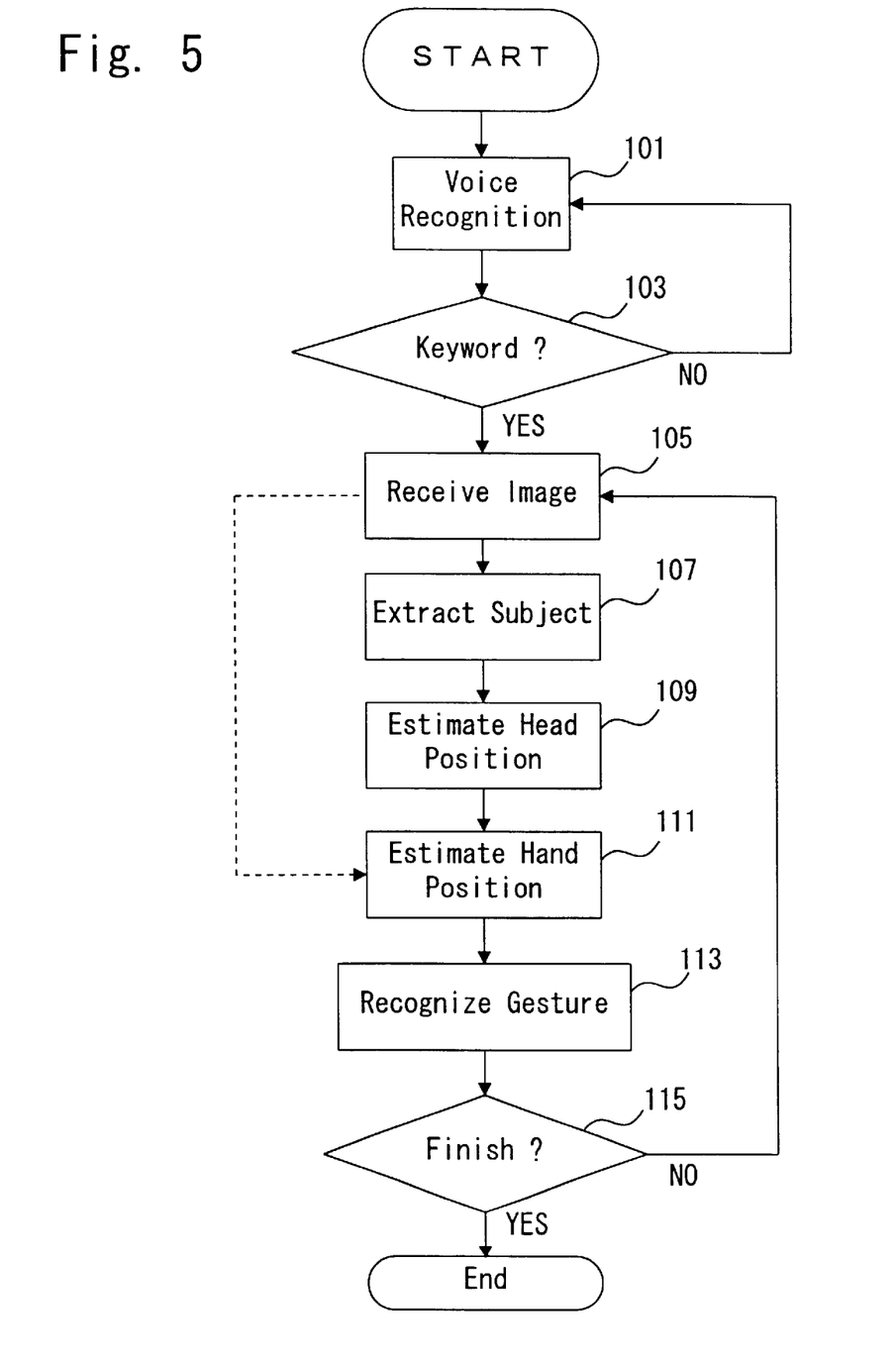
FIG. 5 is a flow chart showing a sequence of process performed to carry out one embodiment of the present invention.

FIG. 5 is a flow chart showing the sequence of the process in accordance with the embodiment described above with reference to FIG. 2. Voice recognition is carried out on the sound input to the microphone 21 (101) to determine if the voice includes one of predetermined keywords (103). If it includes a keyword, a gesture recognition process is initiated. Image frames captured by the CCD camera are passed into the process (105). From the captured image frames, a moving subject is extracted by means of SNAKES scheme as discussed with reference to FIG. 1 (107). The position of the head of the moving subject, a human being, is determined as discussed above (109), and the position of a hand relative to the head is determined as discussed above (111). Based on the relative position of the hand, a gesture performed by the moving subject is determined (113). If the movement of the moving subject is terminated, the gesture recognition process ends, otherwise the process goes back to step 105.

Figure 3:
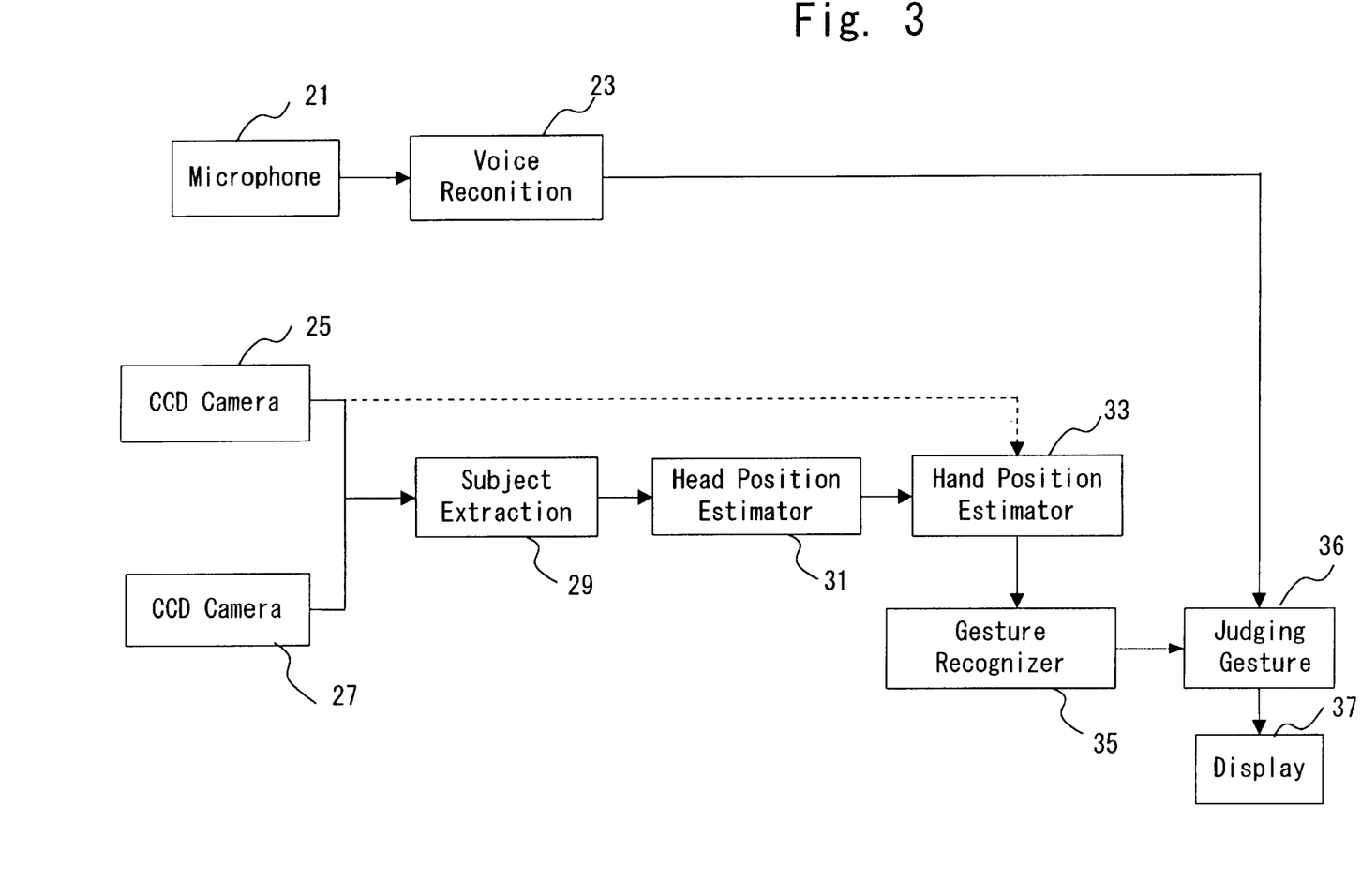
FIG. 3 is a block diagram showing a functional structure of a system in accordance with another embodiment of the present invention.

FIG. 3 is a block diagram of another embodiment of the present invention. The same components as those in the embodiment shown in FIG. 2 are shown by the same reference numbers. This embodiment includes a gesture judging part 36, which is activated by the voice recognizer 23 when a keyword such as "come", and "hello" is recognized. When the voice recognizer 36 receives a vague voice input and cannot clearly determine what was said, it determines a probability that the voice input is a certain word. For example, when a voice input was determined to be "hello" with 70 percent probability, and "come" with 20 percent probability, it passes the output "hello 70, come 20" to the gesture judging part 36.

The gesture recognizer 35 in this embodiment determines probability that a given input from the hand position estimator belongs to each one of the feature clusters that have been prepared as discussed with reference to FIG. 1. For, example, the gesture recognizer 35 determines that a given input from the hand position estimator 33 is "hello" with 60 percent probability, "come" with 50 percent probability, and "bye-bye" with 30 percent probability. It passes output "hello 60, come 50, bye-bye 30" to the gesture judging part 36.

The gesture judging part 36 judges the candidate gesture that has the highest probability in terms of multiplication of the probability value given by the voice recognizer 23 and the probability value given by the gesture recognizer 35. In the above example, the probability that the gesture is "hello" is 42 percent. It is 10 percent for "come" and zero percent for other implications. Thus, the gesture judging part 36 judges that the gesture implies "hello".

Figure 6:
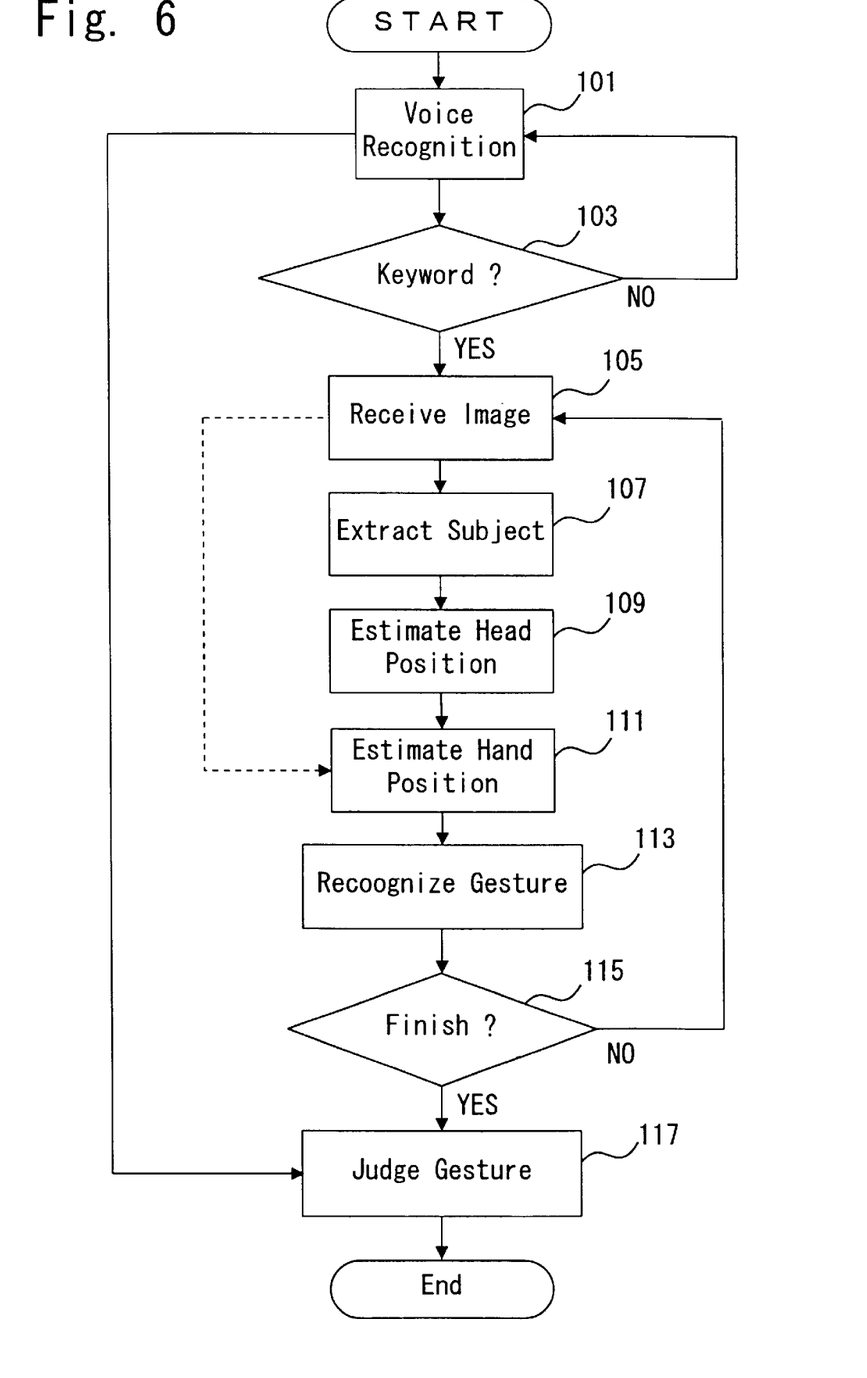
FIG. 6 is a flow chart showing a sequence of process performed to carry out another embodiment of the present invention.

FIG. 6 is a flow chart showing the sequence of process according to the embodiment as illustrated in FIG. 3. In contrast to the process described above with reference to FIG. 5, output of the voice recognition step is passed to a gesture judging step (117) where judgment of a gesture is made combining implication by voice and implication by movement of a hand as discussed above.

Figure 4:
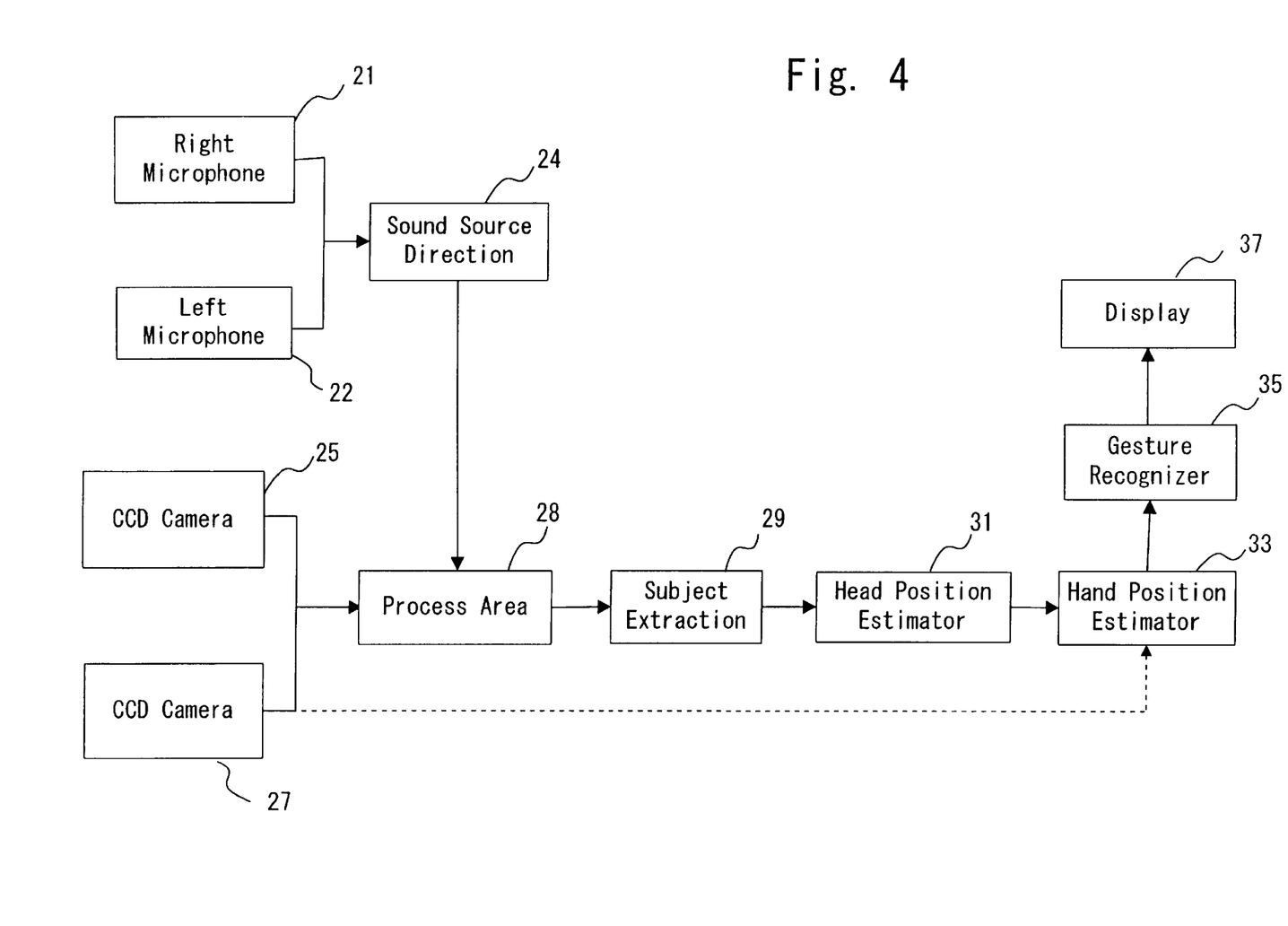
FIG. 4 is a block diagram showing a functional structure of a system in accordance with yet another embodiment of the present invention.

Referring now to FIG. 4, another embodiment of the present invention will be described. The same reference numbers show the same components as the ones illustrated in FIG. 2. The gesture recognition system in accordance with this embodiment differs from the other embodiments in that it has stereo microphones 21, 22 and a unit 24 for determining the direction of the sound source. The unit 24 determines the position of the sound source based on a triangulation scheme.

Figure 8:
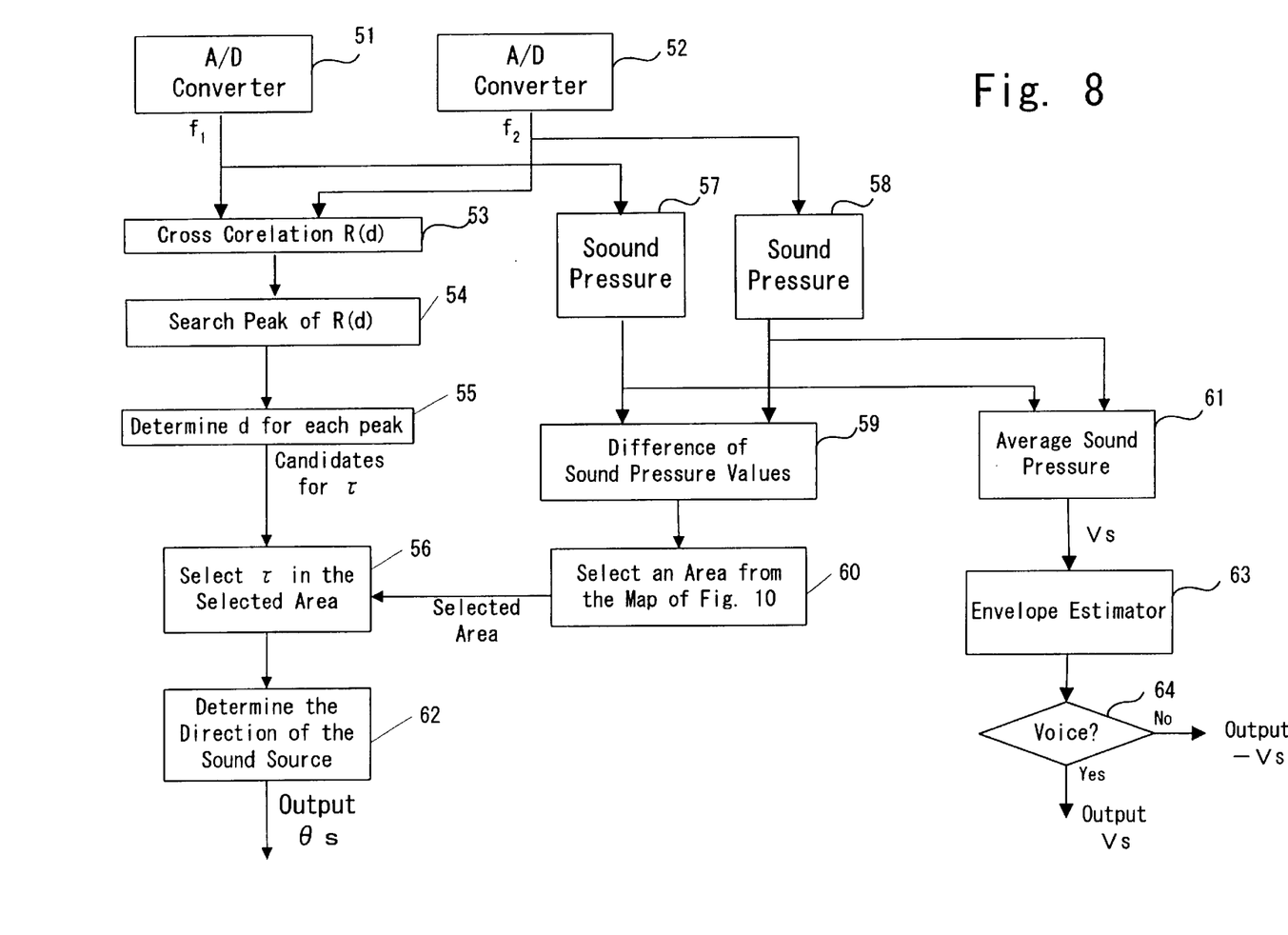
FIG. 8 is a block diagram showing a general structure of a unit for identifying the direction of a sound source and for recognizing human voice.

FIG. 8 illustrates details of the unit 24. An analog to digital converter 51 converts analog sound output from the right microphone 21 into a digital signal $f_1$. Likewise, an analog to digital converter 52 converts analog sound output from the left microphone 22 into a digital signal $f_2$. A cross correlation calculator 53 calculates cross correlation R(d) between $f_1$ and $f_2$ by the following equation:

$$R(d) = \sum_i f_1(i-d)f_2(i) \quad (4)$$

where d denotes lag between $f_1$ and $f_2$.

Based on cross correlation R(d), peaks of R(d) are searched (54). The values of "d" at respective peaks are determined (55), which are the candidates for "τ", the time difference between $f_1$ and $f_2$.

Figure 10:
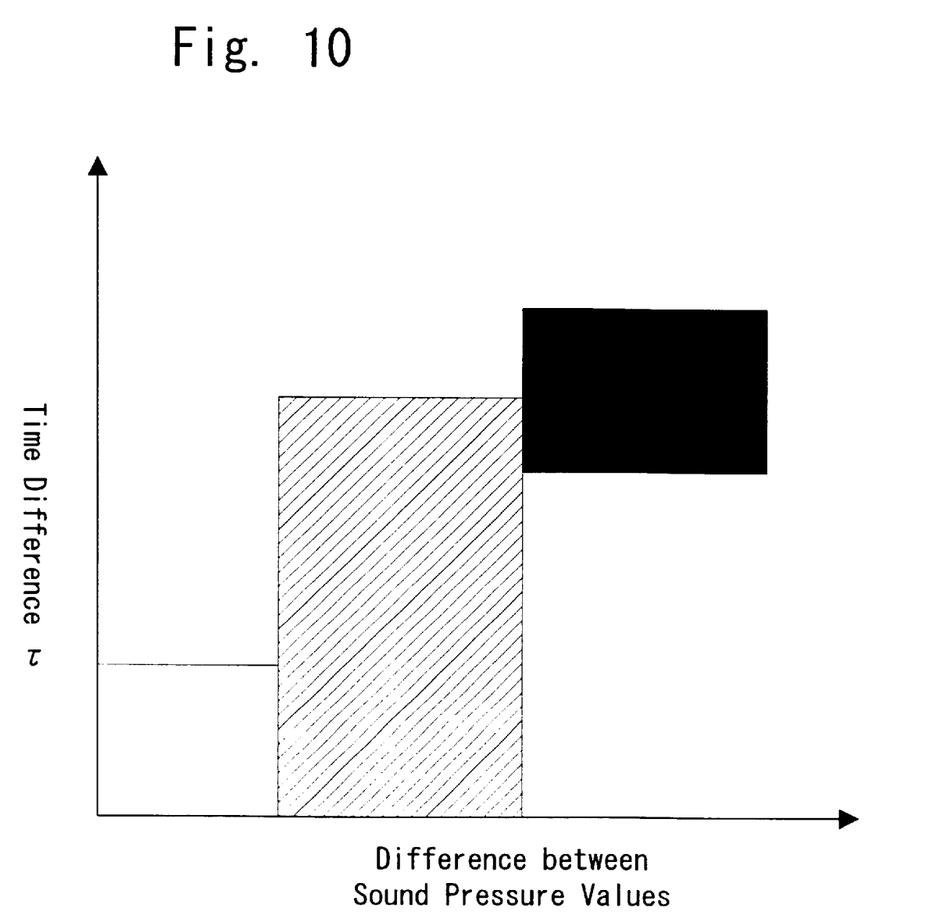
FIG. 10 is a chart showing areas of sound arrival time difference $\tau$ that is defined in relation to the difference between two sound pressure values.

Sound inputs $f_1$ and $f_2$ are fed to sound pressure calculators 57 and 58 where sound pressure is determined respectively in terms of root mean square value of the inputs in a predetermined time window. A sound pressure difference calculator 59 calculates the difference of the two sound pressure values. Based on this sound pressure difference, a selector 60 selects an area from the map shown in FIG. 10. This map has been prepared in advance by simulation and/or experiments and defines the relation between the sound pressure difference and the time difference τ. A primary principle can be that the larger the difference between the sound pressure values is, the larger value is the time difference τ.

Responsive to the input from the selector 60, a selector 56 select a "τ" from the candidates passed from the determination part 55 that belongs to the selected area.

Figure 9:
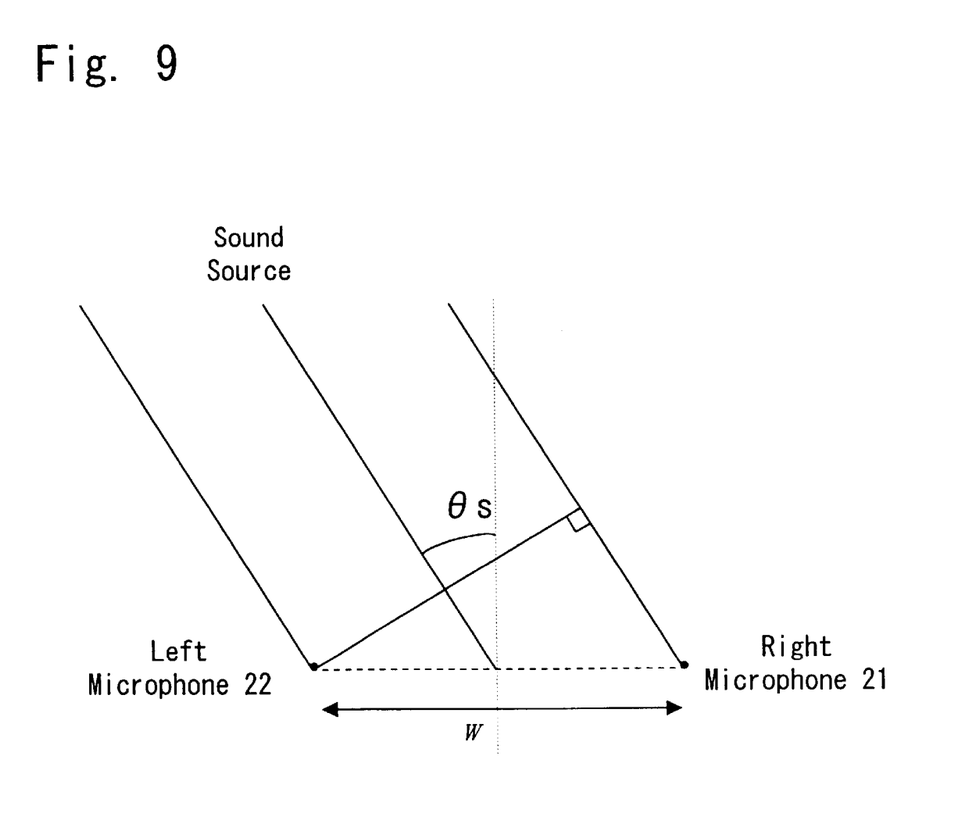
FIG. 9 is a schematic illustration of a theory for identifying the direction of a sound source utilizing two microphones.

A determination part 62 determines the direction of the sound source relative to the two microphones 21, 22. Referring to FIG. 9, the direction θs can be determined by the following equation:

$$\theta s = \sin^{-1}(V \cdot \tau / w) \quad (5)$$

where V is the velocity of the sound, and "w" is the distance between the two microphones 21 and 22.

Figure 11:
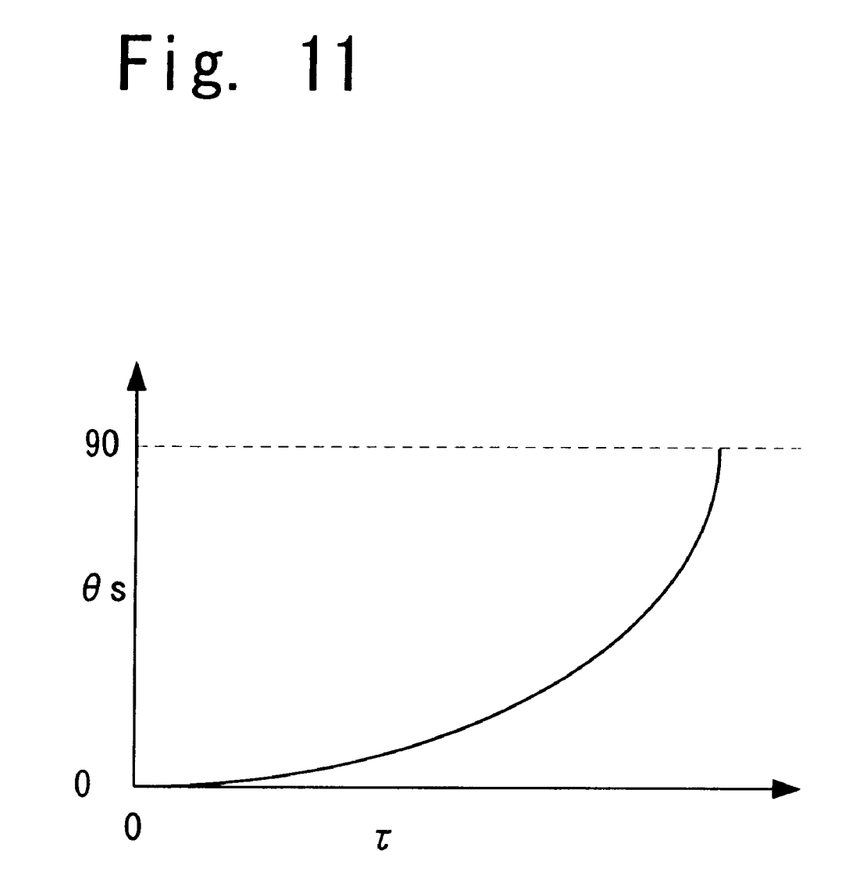
FIG. 11 shows the relationship between the direction of the sound source $\theta s$ and the time difference $\tau$ between the sound $f_1$ and $f_2$.

Alternatively, the direction can be determined referring to a map as shown in FIG. 11. This map has been prepared in advance and is stored in a memory of the system.

If the system is installed in a bipedal robot, the two microphones may be placed at the ears of the robot. The robot can be controlled to move its head to the direction of the sound so that the CCD cameras placed at the eyes of the robot can capture the gesture to be performed by a person who generated the sound.

An average sound pressure calculator 61 receives sound pressure values for sound signals $f_1$ and $f_2$ from the sound pressure calculators 57 and 58 and calculates an average value of the two sound pressure values at each sampling time at which digital values $f_1$ and $f_2$ are generated. An envelope estimator 63 generates an envelope of the sound in time sequence from the average values of the two sound pressure values. A decision block 64 determines whether or not the sound is a human voice based on the envelope of the sound generated by the envelope estimator 63. It is generally known in the voice recognition art that human voice has a unique envelope of sound in its amplitude.

Figure 7:
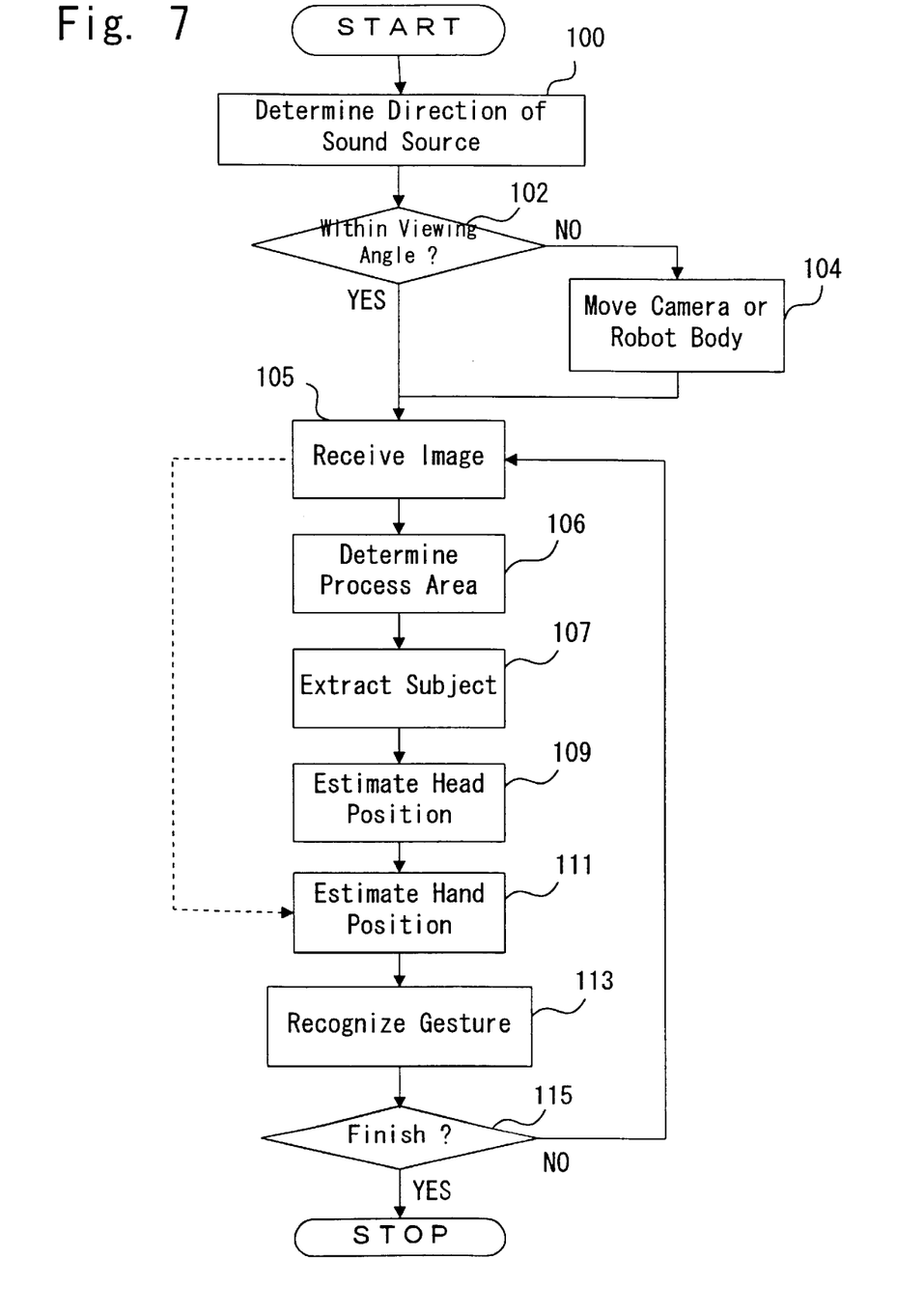
FIG. 7 is a flow chart showing a sequence of process performed to carry out yet another embodiment of the present invention.

FIG. 7 is a flow chart of the process in accordance with the embodiment shown in FIG. 4. The direction of the sound source is determined (100) in a manner as described with reference to FIGS. 4 and 9. If the direction is within a viewing angle of the CCD camera (102), it captures an image of the sound source (105). If the direction is not within the viewing angle of the CCD camera (102), an on-board controller of the robot moves the CCD camera toward the sound source, or moves the robot body and/or head to face the sound source (104) before capturing an image of the sound source (105).

Based on the direction of the sound source as determined by step 100, an area of the image is defined for processing (106) and a moving subject is extracted by means of the scheme as described with reference to FIG. 1 (107). The position of the head of the moving subject, a human being, is determined as discussed above (109), and the position of a hand relative to the head is determined as discussed above (111). Based on the relative position of the hand, a gesture performed by the moving subject is determined (113). If the movement of the moving subject is terminated, the gesture recognition process ends, otherwise the process goes back to step 105.

While the invention was described with respect to specific embodiments, it is not intended that the scope of the present invention is limited to such embodiments. Rather, the present invention encompasses a broad concept as defined by the claims including modifications thereto that can be made by those skilled in the art.

What is claimed is:

1. A computer system for recognizing gestures made by a moving subject, comprising:
    a sound detector for detecting sound;
    one or more image sensors for capturing an image of the moving subject;
    a human recognizer for recognizing a human being from the image captured by said one or more image sensors; and
    a gesture recognizer, activated when human voice is identified by said sound detector, for recognizing a gesture of the human being.

2. The system as recited in claim 1, further comprising:
    a hand recognizer for recognizing a hand of the human being;
    wherein said gesture recognizer recognizes a gesture of the human being based on movement of the hand identified by the hand recognizer.

3. The system as recited in claim 2, further including:
    a head recognizer for recognizing the position of the head of the human being,
    wherein the hand recognizer determines the position of the hand relative to the position of the head determined by the head recognizer.

4. The system as recited in claim 3, further comprising:
    a storage for storing statistical features of one or more gestures relating to position of the hand relative to the position of the head;

an extractor for extracting features of the movement of the hand as recognized by said hand recognizer; and a comparator for comparing the extracted features with the stored features to determine a gesture to which the extracted features belong.

5. The system as recited in claim 3, wherein the hand recognizer recognizes a hand by determining the portion that shows large difference of positions in a series of images captured by the image sensors.

6. The system as recited in claim 1, further comprising:

a voice recognizer recognizing human voice and determining words from the human voice input to said sound detector;

wherein said gesture recognizer is activated responsive to said voice recognizer recognizing one of predetermined keywords.

7. The system as recited in claim 6, wherein said sound detector includes at least two microphones placed at a predetermined distance for determining the direction of the human voice, and said human recognizer identifies a moving subject located in the direction of the human voice as a human being.

8. A walking robot incorporating a computer system for recognizing gestures made by a moving subject, said computer system comprising:

a sound detector for detecting sound;

one or more image sensors for capturing an image of the moving subject;

a human recognizer for recognizing a human being from the image captured by said one or more image sensors; and a gesture recognizer, activated when human voice is identified by said sound detector, for recognizing a gesture of the human being.

9. A computer-implemented method for recognizing human gestures, the method comprising:

identifying a human body based on images captured by one or more image sensors;

recognizing a hand of the human body; and recognizing a gesture of the hand based on movement of the hand, wherein the method is initiated when human voice is recognized.

10. The method according to claim 9, wherein the method is initiated when the human voice is recognized to include one of predetermined keywords.

11. The method according to claim 9, further including a step of determining the direction of the human voice, and a step of moving an image sensor to the direction of the human voice.

* * * * *